US00RE43822E

(19) United States
(12) Reissued Patent
Walker et al.

(10) Patent Number: US RE43,822 E
(45) Date of Reissued Patent: Nov. 20, 2012

(54) SYSTEMS AND METHODS FOR RESOLVING A HAND OF BLACKJACK THAT RESULTS IN A PUSH

(75) Inventors: Jay S. Walker, Ridgefield, CT (US); James A. Jorasch, New York, NY (US); Daniel E. Tedesco, Huntington, CT (US); Geoffrey M. Gelman, Brooklyn, NY (US); Peter Kim, Cupertino, CA (US)

(73) Assignee: IGT, Reno, NV (US)

(21) Appl. No.: 12/346,342

(22) Filed: Dec. 30, 2008

Related U.S. Patent Documents

Reissue of:
(64) Patent No.: 7,156,734
Issued: Jan. 2, 2007
Appl. No.: 09/538,752
Filed: Mar. 30, 2000

U.S. Applications:
(60) Provisional application No. 60/187,259, filed on Mar. 6, 2000.

(51) Int. Cl.
*A63F 9/24* (2006.01)
*A63F 1/00* (2006.01)

(52) U.S. Cl. ..... 463/12; 463/42; 273/292

(58) Field of Classification Search ..... 463/16–22, 463/12–13; 273/292, 138.1, 139
See application file for complete search history.

(56) References Cited

U.S. PATENT DOCUMENTS 4,027,882 A 6/1977 Rosenberg
4,428,580 A 1/1984 Pazquine
4,448,419 A 5/1984 Telnaes
4,624,459 A 11/1986 Kaufman
5,018,736 A 5/1991 Pearson et al.
5,275,416 A 1/1994 Schorr et al.
5,324,041 A 6/1994 Boylan et al.
5,362,064 A 11/1994 Lofink et al.
5,364,105 A 11/1994 Jones
5,393,057 A 2/1995 Marnell, II
5,411,268 A 5/1995 Nelson et al.
5,472,194 A 12/1995 Breeding et al.

(Continued)

OTHER PUBLICATIONS

Linya "Lucky" Quan, "The Asian Games, Part II—An Introduction to Pai Gow Poker", Apr. 1992, Win Magazine, at p. 39-40, 70.

(Continued)

*Primary Examiner* — Dmitry Suhol
*Assistant Examiner* — Alex F. R. P. Rada, II
(74) *Attorney, Agent, or Firm* — Neal, Gerber & Eisenberg LLP

(57) ABSTRACT

Systems and methods are provided for resolving a hand of blackjack played by a player. If it is determined that the hand of blackjack has resulted in a push, then it is determined if the player has won the hand of blackjack based on a random outcome. For example, a dealer may receive from the player an indication of a wager amount associated with a hand of blackjack. The hand of blackjack may then be played according to traditional rules. If it is determined that the hand has resulted in a push, an indication of a random outcome may be received. The random outcome may be, for example, statistically independent of the hand of blackjack. Based on the random outcome, it is determined if the player has won the hand of blackjack. If the player has won, he or she receives payment of a winning amount based on the wager amount.

40 Claims, 6 Drawing Sheets

U.S. PATENT DOCUMENTS

| | | | |
|---|---|---|---|
| 5,494,287 | A | 2/1996 | Manz |
| 5,511,784 | A | 4/1996 | Furry et al. |
| 5,551,697 | A | 9/1996 | Willenbring |
| 5,580,061 | A | 12/1996 | Kong |
| 5,607,161 | A | 3/1997 | Skratulia |
| 5,630,586 | A | 5/1997 | Lowden |
| 5,669,606 | A | 9/1997 | Brown |
| 5,690,335 | A | 11/1997 | Skratulia |
| 5,692,755 | A | 12/1997 | Gutierrez |
| 5,707,285 | A | 1/1998 | Place et al. |
| 5,746,432 | A | 5/1998 | Feola |
| 5,758,878 | A | 6/1998 | Brown |
| 5,782,472 | A | 7/1998 | Brown |
| 5,788,574 | A | 8/1998 | Ornstein et al. |
| 5,800,268 | A | 9/1998 | Molnick |
| 5,803,460 | A | 9/1998 | Hesse |
| 5,842,698 | A | 12/1998 | Brown |
| 5,857,676 | A | 1/1999 | Whitson |
| 5,924,926 | A | 7/1999 | Brown |
| 5,941,773 | A | 8/1999 | Harlick |
| 5,954,335 | A | 9/1999 | Moody |
| 5,988,643 | A | 11/1999 | Awada |
| 6,000,699 | A | 12/1999 | Long |
| 6,062,563 | A | 5/2000 | De Keller |
| 6,070,875 | A | 6/2000 | Boylan et al. |
| 6,179,291 | B1 | 1/2001 | Vancura |
| 6,379,247 | B1 | 4/2002 | Walker et al. |
| 6,394,456 | B1 | 5/2002 | Long |
| 6,547,246 | B2 | 4/2003 | Webb |
| 7,156,734 | B1 | 1/2007 | Walker et al. |
| 2002/0074724 | A1 | 6/2002 | Webb |

OTHER PUBLICATIONS

Frank Scoblete, "Guerrilla Gambling: How to Beat the Casino at Their Own Game", Bonus Books, Inc., 1993, at p. 38-41.

Eric Pivnik, "Silver Legacy's Twist-A-Jack Strategy Query?—deja.com", Jan. 8, 1997, (http://www.deja.com).

Jay S. Walker et al., "Method and System for Awarding Frequent Flyer Miles for Casino Play", U.S. Appl. No. 08/888,962, filed Jul. 7, 1997 (Pending).

"Trip Report: LA → Las Vegas → Laughlin and Back: Long—deja.com", Nov. 1, 1998, (http://www.deja.com).

Roger Gros, "When a Push Isn't Necessarily a Push—New Blackjack Option Rewards Players Who Tie the Dealer . . . but at What Cost?", Casinovations, Dec. 1998.

Bert Caldwell, "An AP Evergreen Exchange—Spokane Company Betting Digital Casino Games Will Take Off", Jul. 12, 1999, Monday, BC Cycle, The Associated Press State & Local Wire, Section: Business News.

300

| RANDOM OUTPUT 302 | WINNING AMOUNT 304 |
|---|---|
| 0 - 21 | -100% |
| 22 - 27 | 100% |
| 28 | 200% |
| 29 | 300% |
| 30 | 400% |
| 31 | 500% |

FIG. 3

SYSTEMS AND METHODS FOR RESOLVING A HAND OF BLACKJACK THAT RESULTS IN A PUSH

Matter enclosed in heavy brackets [ ] appears in the original patent but forms no part of this reissue specification; matter printed in italics indicates the additions made by reissue.

CROSS-REFERENCES TO RELATED APPLICATIONS

The present application claims the benefit of provisional U.S. Patent Application Ser. No. 60/187,259 filed Mar. 6, 2000. The entire content of this application is incorporated by reference herein.

FIELD

The present invention relates to the game of blackjack. In particular, the present invention relates to systems and methods for resolving a hand of blackjack that results in a push.

BACKGROUND

Blackjack is one of the most popular table games among players who visit casinos. One reason for blackjack's popularity is its simplicity. A player places a wager of a wager amount and competes against a dealer by accumulating playing cards. The party (i.e., the dealer or the player) that accumulates cards having the highest numerical total, without exceeding twenty-one, wins the hand of blackjack. When determining a total, face cards are counted as ten, and an ace can be counted as either a one or an eleven.

When a party has two cards that total twenty-one (e.g., an ace and a queen), he or she has a "natural" which will always win unless the other party also has a natural. That is, a player who has an ace and a queen (for a total of twenty-one) will win against a dealer who has a nine, a seven and a three (also for a total of twenty-one). A player who accumulates cards having a total greater than twenty-one (e.g., a nine, an eight, and a six) always loses, even if the dealer also accumulates cards having a total greater than twenty-one. A further discussion of blackjack rules can be found in Stanford Wong, "Professional Blackjack" (1994).

The winning party receives payment of a winning amount based on the wager amount. For example, if a player loses, he or she may provide payment of the wager amount to the dealer. Similarly, if the player wins, he or she may retain the original wager amount and receive an additional payment of an amount equal to the wager amount from the dealer. In the case of a winning natural, the player may receive a larger wining amount (e.g., payment of an amount equal to one and a half times the wager amount).

The rules traditionally used to play blackjack, however, have a disadvantageous feature. In particular, approximately 8.7% of all hands will result in a tie between the player and the dealer (depending in part on a player's behavior), also known as a "push." For example, both the dealer and the player may accumulate cards having a total of nineteen. Similarly, both the dealer and the player may have a natural. In such cases, neither the dealer nor the player win and no money changes hands.

A casino is not satisfied when a blackjack hand results in a push, because such a result represents a lost opportunity for the casino. That is, every push provides no profit for the casino. If the number of pushes could be reduced or eliminated, the amount of profit that could be made by the casino would increase (assuming that the odds of winning the blackjack hand are statistically in the casino's favor).

A player may also not be satisfied when a hand of blackjack results in a push. The lack of a winning result, or even a losing result, may reduce the player's excitement and interest in the game.

In a "Push Your Luck" blackjack game, a player can place a side wager, before a hand of blackjack is played, betting that the hand will result in a push. If the blackjack hand does result in a push, the player wins the side wager (e.g., wins an amount based on the side wager, the number of hands being played, and/or a random number generator).

The Push Your Luck system, however, also has a number of disadvantages. For example, the side wager does not resolve the hand of blackjack itself. In addition, a player must place the side wager prior to playing the hand of blackjack, and many players may be unwilling to do so. Moreover, having a separate wager may complicate and slow down the game, reducing one of the reasons why blackjack is so popular. Another disadvantage is that a player may change the way he or she plays the game (e.g., by accumulating additional cards) to increase the chance of achieving a push. For example, a player may attempt to keep track of which playing cards remain in the deck (i.e., by "counting cards") to increase his or her chances of winning the side wager.

A need exists, therefore, for systems and methods to resolve a hand of blackjack that results in a push.

SUMMARY OF THE INVENTION

To alleviate problems inherent in the prior art, the present invention introduces systems and methods for resolving a hand of blackjack that results in a push.

In one embodiment of the present invention, it is determined that a hand of blackjack has resulted in a push. Based on a random outcome, it is determined if a player has won the hand of blackjack.

Another embodiment of the present invention comprises means for determining that a hand of blackjack has resulted in a push and means for determining if a player has won the hand of blackjack based on a random outcome.

With these and other advantages and features of the invention that will become hereinafter apparent, the nature of the invention may be more clearly understood by reference to the following detailed description of the invention, the appended claims and the several drawings attached herein.

BRIEF DESCRIPTION OF THE DRAWINGS

FIG. 3 is a tabular representation of a winning amount database according to an embodiment of the present invention.

DETAILED DESCRIPTION

The present invention is directed to systems and methods for resolving a hand of blackjack that results in a push. Referring in detail to the drawings, FIG. 1 is a schematic view of a blackjack table 100 and associated components according to an embodiment of the present invention.

Figure 1:
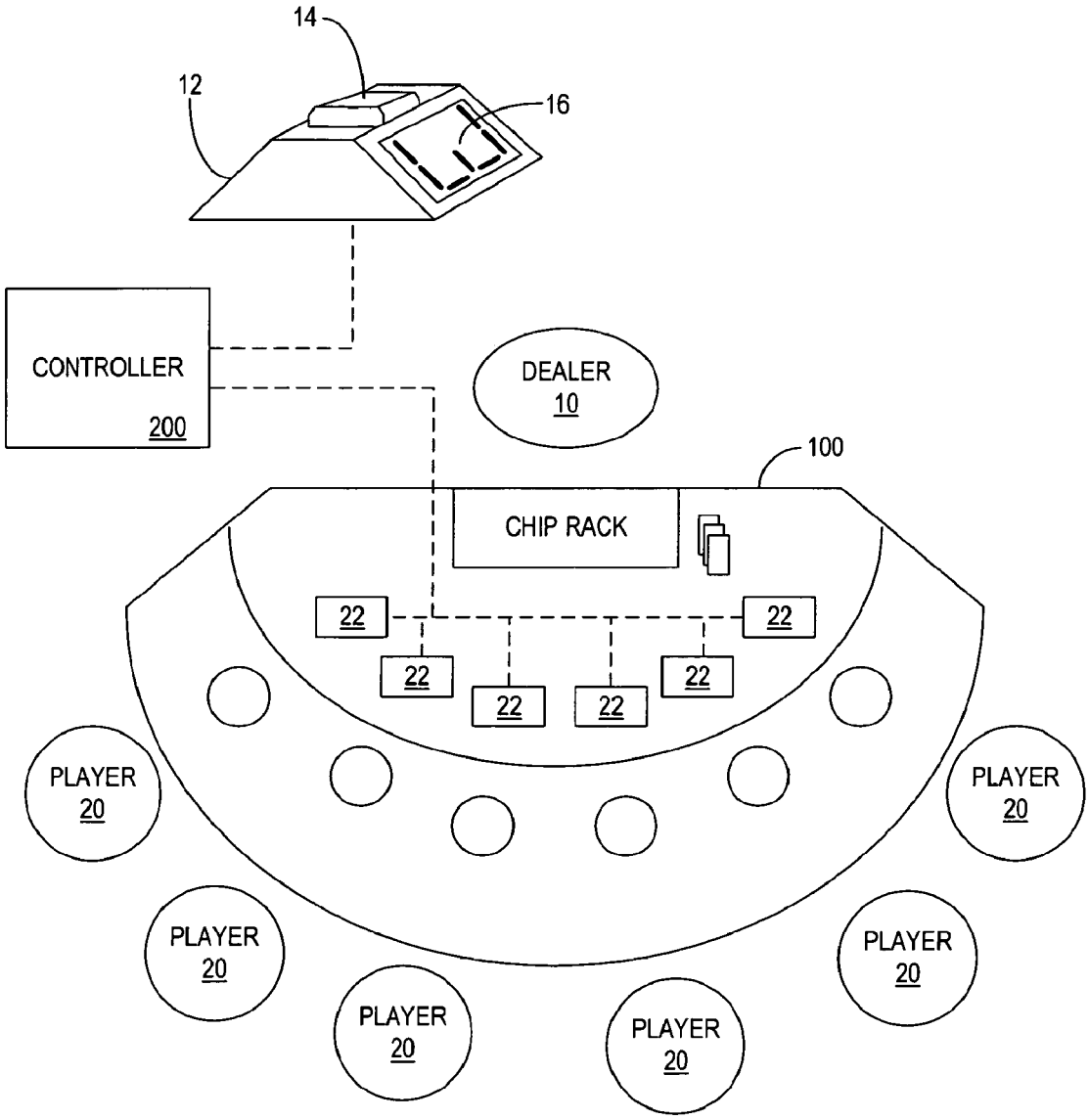
FIG. 1 is a schematic view of a blackjack table and associated components according to an embodiment of the present invention.

As shown in FIG. 1, the blackjack table 100 accommodates a dealer 10 and a number of players 20. A dealer device 12 is located adjacent to the dealer 10, and a number of player devices 22 are located adjacent to the players 20. Although only a single dealer device 12 is shown in FIG. 1, it will be understood that any number of dealer devices 12 (e.g., associated with any number of blackjack tables 100) may be used in accordance with the present invention.

According to an embodiment of the present invention, the dealer 10 uses the dealer device 12 to resolve a hand of blackjack that results in a push. As will be explained, the dealer 10 may instead use other methods (e.g., performed with a coin, a pair of dice, or a roulette-style wheel) to resolve the push according to the present invention.

The dealer device 12 includes a dealer input device 14 that the dealer 10 may use to initiate a random outcome (e.g., an outcome used to determine if a player 20 wins or loses). The dealer input device 14 may comprise, for example, a button, a microphone, and/or a sensor (e.g., a camera or a bar code reader) capable of determining numerical totals of accumulated playing cards associated with the dealer 10 and/or the player 20. One example of a commercially available device that may function as a dealer input device 14 is the SCANJACK® dealer card scanner available from Peripheral Dynamics, Inc.®

The dealer device 12 also includes a dealer output device 16 to indicate the random outcome to the dealer 10 and/or the player 20 (e.g., a "W" if the player 20 wins or an "L" if the player 20 loses). The dealer output device 16 may comprise, for example, a video monitor, a speaker, and/or a Liquid Crystal Display (LCD) device.

The dealer device 12 and the player devices 22 are in communication with a controller 200. As used herein, devices (such as the dealer device 12, the player devices 22, and/or the controller 200) may communicate, for example, via a dedicated connection or via a communication network, such as a Local Area Network (LAN), a Wide Area Network (WAN), a Public Switched Telephone Network (PSTN), or an Internet Protocol (IP) network such as the Internet, an intranet or an extranet. Moreover, as used herein, communications include those enabled by wired and/or wireless technology. Also note that devices may communicate with each other without being in constant communication.

In general, the controller 200 may be any device capable of performing methods in accordance with the present invention, such as a Personal Computer (PC). Note that any of the dealer device 12, the player devices 22, and/or the controller 200 may be incorporated in a single device (e.g., the dealer device 12 may also serve as the controller 200).

According to an embodiment of the present invention, when a blackjack hand between the dealer 10 and a player 20 results in a push (e.g., both accumulated cards having a total of nineteen), the dealer 10 may activate the dealer input device 14 on the dealer device 12. The dealer device 12 may then, for example, communicate with the controller 200 to request a random outcome. The controller 200 may transmit an indication of the random outcome to the dealer device 12, which in turn displays the random outcome via the dealer output device 16.

By having the dealer 10 operate a simple dealer device 12 to resolve a hand of blackjack, the game may proceed quickly and the process can be seamlessly incorporated into normal casino play at the blackjack table 100.

In another embodiment, each player 20 uses his or her own player device 22 to resolve a hand of blackjack that results in a push. The player devices 22 may be, for example, built into the blackjack table 100 near each player's seat. In this case, a player 20 who achieves a push may use the player device 22 to generate a random outcome (e.g., by sending a request to the controller 200).

According to another embodiment, the player device 22 is a portable computing device, such as a Personal Digital Assistant (PDA), that the player 20 can bring to the blackjack table 100. In general, the player device 22 may be any device capable of performing the functions described herein, including any communication or storage device (e.g., a magnetic strip card or a smart card).

An example of a controller 200 that may be used in connection with the blackjack table 100 will now be described in detail with respect to FIG. 2.

Figure 2:
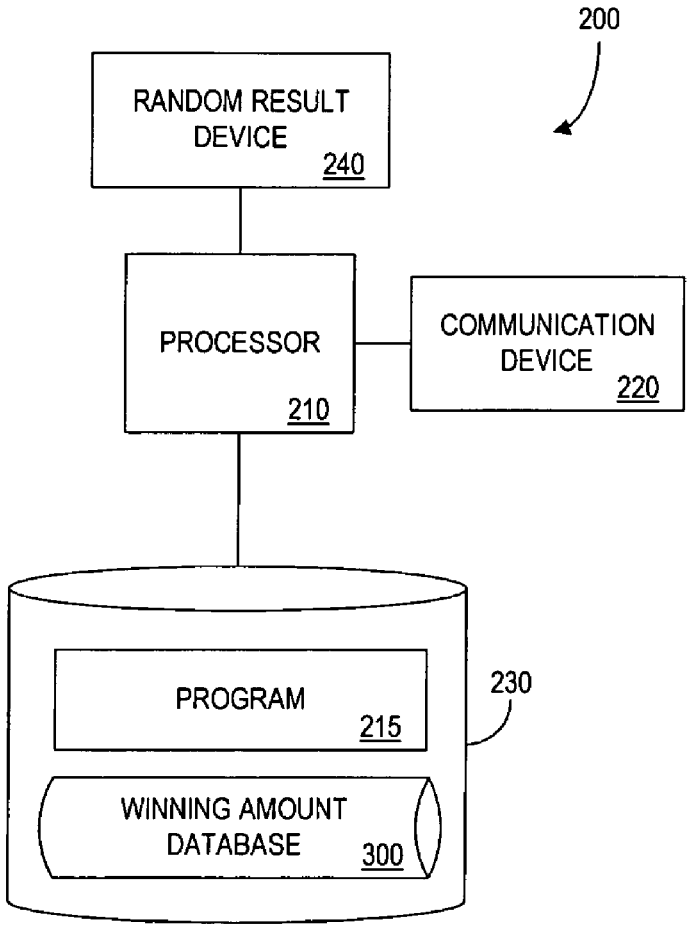
FIG. 2 is a block diagram overview of a controller according to an embodiment of the present invention.

FIG. 2 illustrates a controller 200 that is descriptive of the device shown in FIG. 1. According to an embodiment of the present invention, the controller 200 comprises a processor 210, such as one or more INTEL® Pentium® processors, coupled to a communication device 220 configured to communicate through a communication network (not shown in FIG. 2). The communication device 220 may be used to communicate, for example, with one or more dealer devices 12, and/or one or more player devices 22.

The controller 200 also includes a random result device 240, such as a random number generator. By way of example, the random result device 240 may be a five-bit random number generator that randomly outputs a result from zero (i.e., a binary 00000) to thirty one (i.e., a binary 11111).

The processor 210 is also in communication with a storage device 230. The storage device 230 may comprise any appropriate information storage device, including magnetic storage devices (e.g., magnetic tape and hard disk drives), optical storage devices, and/or semiconductor memory devices such as Random Access Memory (RAM) devices and Read Only Memory (ROM) devices.

The storage device 230 stores a program 215 for controlling the processor 210. The processor 210 performs instructions of the program 215, and thereby operates in accordance with the present invention. For example, the processor 210 may determine that a hand of blackjack has resulted in a push (e.g., by receiving a signal from the dealer device 12 or the player device 22) and, based on a random outcome, determine if a player 20 has won the hand of blackjack.

The program 215 may be stored in a compressed, uncompiled and/or encrypted format. The program 215 furthermore includes program elements, such as an operating system, a database management system, and/or "device drivers" used by the processor 210 to interface with peripheral devices. Appropriate program elements are known to those skilled in the art.

Note that the processor 210 and the storage device 230 may be, for example, (i) located entirely within a single computer or other computing device or (ii) located in separate devices coupled through a communication channel. In one embodiment, the controller 200 comprises one or more computers that are connected to a remote database server.

As used herein, information may be "received" by or "transmitted" to, for example, (i) the controller 200 from a dealer device 12 or a player device 22 or (ii) a software application or module within the controller 200 from another software application, module or any other source.

As shown in FIG. 2, the storage device 230 also stores a winning amount database 300. An example of a winning amount database 300 that may be used in connection with the controller 200 will now be described in detail with respect to FIG. 3. The schematic illustration and accompanying description of the winning amount database 300 presented herein is exemplary, and any number of other database arrangements may be used instead.

Referring to FIG. 3, a table represents one embodiment of the winning amount database 300 that may be stored at the controller 200 according to an embodiment of the present invention. The information in the winning amount database 300 may be created and updated, for example, based on information received from an operator of a casino.

The table includes entries identifying one or more random outcomes. In particular, the winning amount database 300 shown in FIG. 3 illustrates random outputs 302 generated by a five-bit random result device 240 (e.g., representing the numbers 0 through 31).

The winning amount database 300 also defines a corresponding winning amount 304 for each random output 302. The winning amount 304 indicates a percentage of a player's wager amount that should be paid to the player 20 (including the player's original wager amount). A negative percentage (i.e., as illustrated by the first entry of the winning amount database 300) indicates that the player 20 should instead provide a payment to the dealer 10.

For example, consider a player 20 who places a $20 wager at a blackjack table 100. The dealer 10 and the player 20 then play a hand of blackjack until a push results. In this case, if the random output 302 is "15" and the player 20 provides a payment of $20 to the dealer 10. If the random output 302 is "29" the player 20 receives a payment of $60 (i.e., 300% of the $20 wager amount), which includes the player's original wager amount, from the dealer 10.

As shown in FIG. 3, the winning amount table 300 may be arranged such that the dealer 10 (i.e., the casino) retains a statistical advantage over the player 20. Table I illustrates the expected value associated with each of the winning amounts 304 to a player 20 who places a one dollar wager.

TABLE I

Expected Values Associated With a One Dollar Wager Amount

| Random Output | Winning Amount | Expected Value |
|---|---|---|
| 0-21 | −100% | (22/32) * (−1.00) = −0.68750 |
| 22-27 | 100% | (6/32) * (1.00) = 0.18750 |
| 28 | 200% | (1/32) * (2.00) = 0.06250 |
| 29 | 300% | (1/32) * (3.00) = 0.09375 |
| 30 | 400% | (1/32) * (4.00) = 0.12500 |
| 31 | 500% | (1/32) * (5.00) = 0.15625 |
| | | Total Expected Value = −0.06250 |

As shown in Table I, the winning amounts 304 defined in the winning amount database 300 give the dealer 10 a 6.25% advantage over the player 20. In this way, the casino will, over time, earn a profit on hands of blackjack that result in a push.

The random outputs 302 and/or the winning amounts 304 may be modified in any number of ways (e.g., by increasing the winning amounts 304) to adjust the dealer's advantage, or even to remove the advantage or to give the advantage to the player 20.

Other factors may also be used to determine the winning amount 304. For example, a higher wining amount 304 may be awarded based on the number of hands being played, and/or the particular playing cards accumulated by the dealer 10 or the player 20 (e.g., the winning amount 304 may be increased if the player 20 has a natural or if the player 20 accumulated cards having a total of twenty). According to another embodiment, information associated with the player 20 is used to determine the winning amounts 304 (e.g., increased winning amounts 304 may be provided to new players or to frequent players).

As can be seen, FIG. 3 depicts a database in which data is organized in a data structure in accordance with an embodiment of the present invention. The data structure includes a random output data object (e.g., the random output 302) representing a random output; and a winning amount data object (e.g., the winning amount 304) accessible from the random output data object and representing (i) whether a blackjack hand that results in a push will be won by a player 20, and (ii) a winning amount that may be paid to the player 20.

Methods that may be used according an embodiments of the present invention will now be described in detail with respect to FIGS. 4 and 5.

Figure 4:
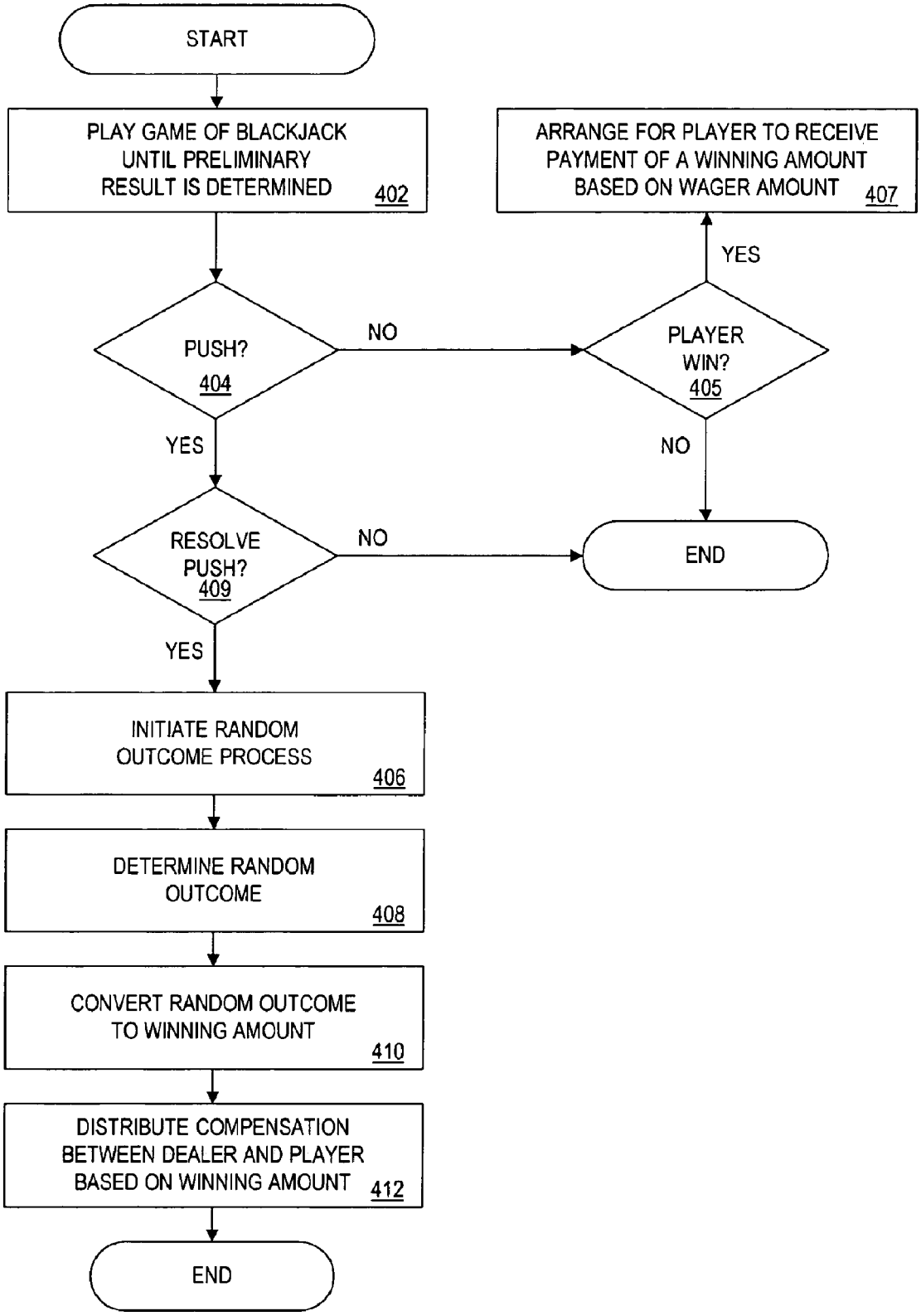
FIG. 4 is a flow chart illustrating a method according to an embodiment of the present invention.

FIG. 4 is a flow chart of a method which may be performed, for example, by the controller 200 to resolve a hand of blackjack according to an embodiment of the present invention. The flow chart in FIG. 4, as well as the other flow charts discussed herein, does not imply a fixed order to the steps, and embodiments of the present invention can be practiced in any order that is practicable.

At 402, a hand of blackjack is played until a preliminary result is determined. For example, the dealer 10 may receive from a player 20 an indication of a wager amount associated with the hand of blackjack. The dealer 10 and the player 20 then accumulate playing cards according to the traditional rules (e.g., including any casino rules). The preliminary result (i.e., the result prior to resolving any push) may be that the dealer 10 wins, the player 20 wins, or neither the dealer 10 nor the player 20 wins (i.e., a push).

At 404, it is determined if the hand of blackjack has resulted in a push. If the hand has not resulted in a push (i.e., if the dealer 10 or the player 20 have won according to the traditional rules of blackjack), the process continues to 405, where it is determined whether the player wins. If the player does win, at 407 it is arranged for the player to receive payment of a winning amount based on a wager amount. If it is determined at 405 that the player does not win, the process ends.

If it is determined that the hand of blackjack has resulted in a push at 404, at 409 it is determined whether the push is to be resolved. If the push is not to be resolved, the process ends. If the push is to be resolved, a random outcome process is initiated at 406. The random outcome process may be initiated, for example, using the dealer device 12 or the player device 22.

According to another embodiment of the present invention, the player 20 is allowed to decide whether or not the push will be resolved (i.e., the player 20 may decide that the hand will remain a tie and no money will be exchanged). According to another embodiment, the dealer 10 decides whether or not the push will be resolved (e.g., based on casino rules). For example, a casino rule may indicate that a blackjack hand will not be resolved if two naturals resulted in a push.

At 408, the random outcome is determined. This may comprise, for example, receiving the random outcome, such as an outcome that is statistically independent of the hand of blackjack that was played prior to the push, from the controller 200. According to one embodiment, the random outcome is determined before the hand of blackjack resulted in a push. For example, the controller 200 may use a stored list of pre-generated random numbers to resolve the hand of blackjack.

In this case, the pre-generated random outcome may be concealed from the player 20 until a push has been determined.

According to another embodiment, the random outcome is not received from the controller 200. For example, the random outcome may be generated using at least one die (e.g., the dealer 10 and/or the player 20 may roll a pair of dice). According to another embodiment, the dealer 10 and/or the player 20 use a coin to generate the random outcome (i.e., by flipping the coin). Similarly, a rotating wheel (e.g., a roulette-style wheel) may be used by the dealer 10 and/or the player 20 to generate the random outcome.

According to one embodiment, a set of playing cards (e.g., a deck of playing cards) are used to determine the random outcome. The set of playing cards may be, for example, the same deck of playing cards used in the hand of blackjack. For example, the dealer may simply select the next playing card from the deck to generate a random outcome. According to another embodiment, a different the set of playing cards is used instead.

At 410, the random outcome is converted to a winning amount. This may comprise, for example, simply determining if the player 20 has won the hand of blackjack. That is, the random outcome may have a first state indicating that the player 20 has won and a second state indicating that the player 20 has lost. For example, if the random outcome was generated using a coin, a "heads" may indicate that the player 20 has won and a "tails" may indicate that the player 20 has lost. In this case, the winning amount may be determined using, for example, the traditional rules of blackjack (e.g., the player 20 may win an amount based on his or her wager amount).

According to another embodiment, the random outcome has a plurality of states, and at least two of the plurality of states are associated with different winning amounts. For example, the winning amount database 300 may indicate that the player 20 has won an amount based on 200% or 300% of the wager amount.

At 412, compensation is distributed between the dealer 10 and the player 20 based on the winning amount. For example, the dealer 10 may arrange for the player 20 to receive payment of a winning amount when the player has been determined to be the winner of the hand (i.e., the push is resolved in favor of the player 20). The winning amount may be based on, for example, the wager amount, the random outcome, information associated with the player 20 (e.g., demographic information), a time of day, a time of year (e.g., higher winning amounts may be provided during a special casino promotion) and/or at least one card accumulated by the dealer 10 or the player 20 during the hand of blackjack.

Figure 5:
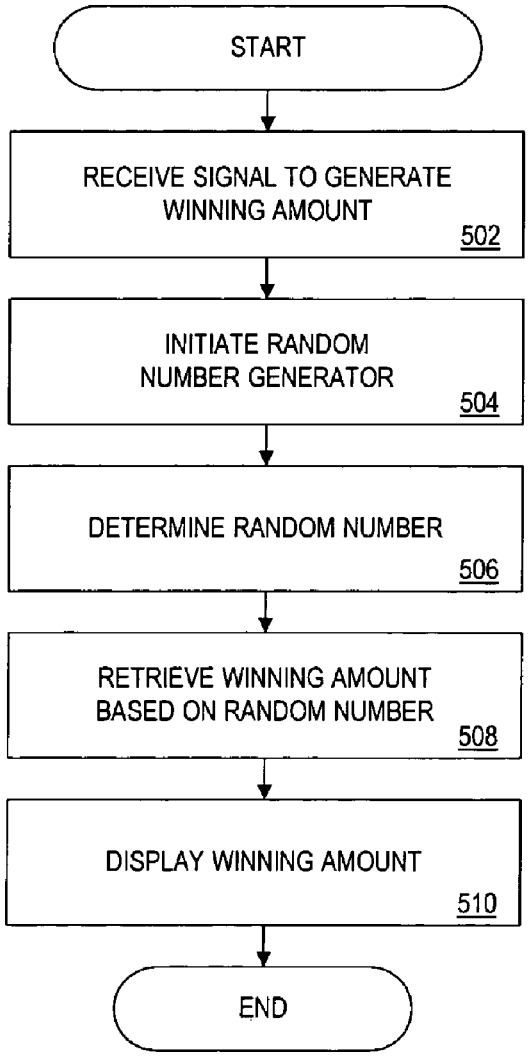
FIG. 5 is a flow chart illustrating a method according to another embodiment of the present invention.

FIG. 5 is a flow chart illustrating another method according to an embodiment of the present invention. At 502, a signal to generate a winning amount is received. For example, the dealer 10 may use the dealer input device 14 to send the signal to the controller 200. Similarly, the player 20 may use the player device 22 to send the signal to the controller 200.

At 504, a random number generator is initiated. For example, the processor 210 in the controller 200 may initiate the random result device 240. At 506, a random number is determined, such as a random number determined based on a signal received from the five-bit random result device 240.

A winning amount is retrieved at 508 based on the random number. For example, the processor 210 may access the winning amount database 300 to determine the winning amount (e.g., 300% of a wager amount). The winning amount is then displayed to the dealer 10 and/or the player 20 at 510. For example, the winning amount may be displayed via the dealer display 16 or the player device 22. The dealer 10 may use then displayed winning amount to pay the player 20 (e.g., by paying the player 300% of his or her wager amount).

Figure 6:
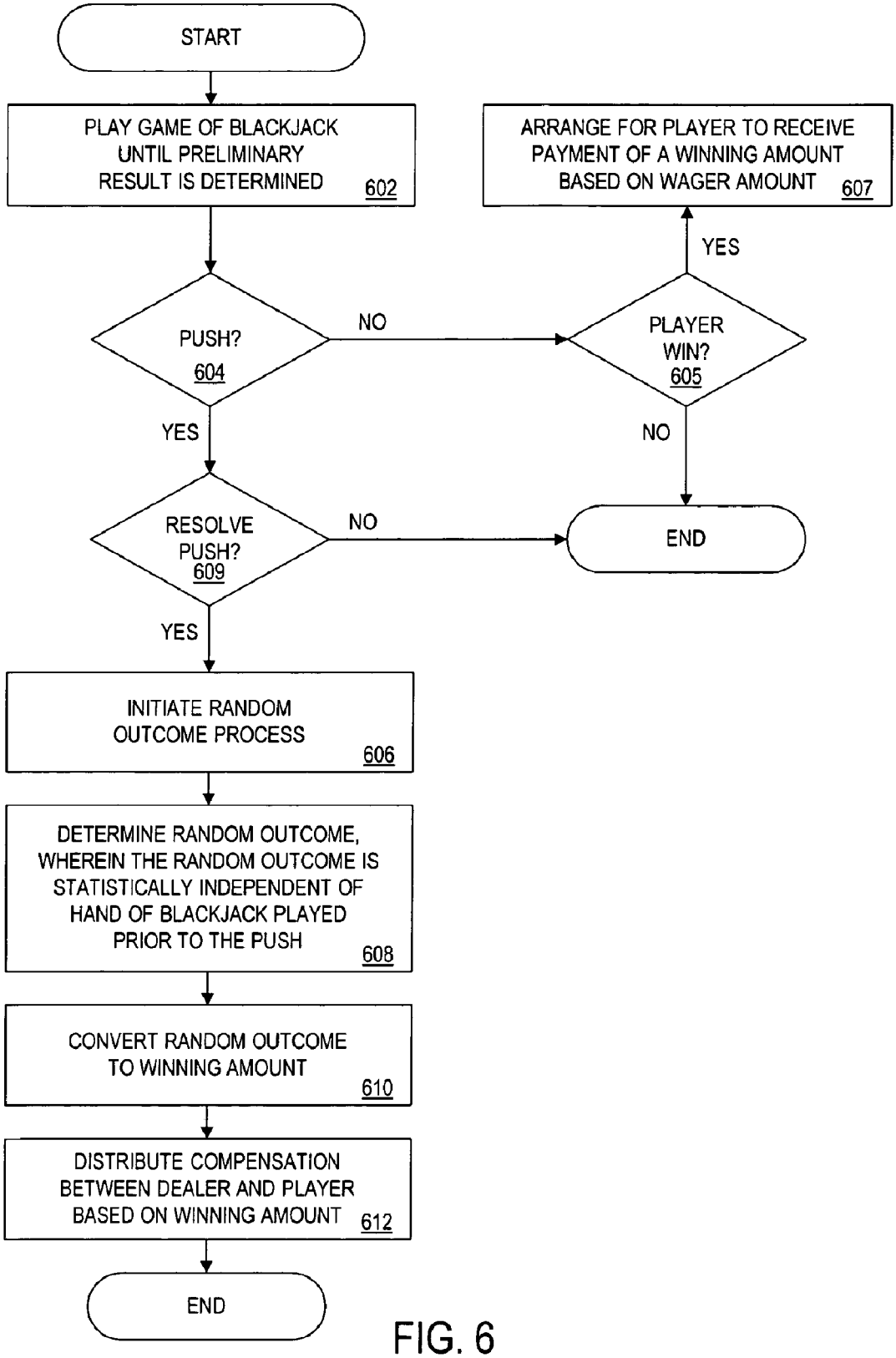
FIG. 6 is a flow chart illustrating a method according to another embodiment of the present invention.

FIG. 6 is a flow chart illustrating another method according to an embodiment of the present invention. At 602a game of blackjack is played until a preliminary amendment is determined. At 604 it is determined whether a hand of blackjack resulted in a push. If the hand of blackjack has not resulted in a push, at 605 it is determined whether a player has won the hand. If a player has won the hand, at 607 it is arranged for the player to receive payment of a winning amount based on a wager amount. If the player has not won the hand, the process ends.

If it is determined at 604 that the hand of blackjack has resulted in a push, at 609 it is determined whether the push is to be resolved. If the push is not to be resolved, the process ends. If the push is to be resolved, at 606 a random process is initiated. Step 606 is analogous to step 406 and need not further be described herein. At 608 a random outcome is determined, wherein the random outcome is statistically independent of the hand of blackjack played prior to the push. At 610 the random outcome is converted to a winning amount. Step 610 is analogous to step 410, described above with respect to FIG. 4, and need not be further described. At 612, compensation is distributed between the dealer and the player based on the winning amount. Step 612 is analogous to step 412, described with reference to FIG. 4, and need not be further described.

ADDITIONAL EMBODIMENTS

The following are several examples which illustrate various embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

According to one embodiment, a random outcome is used to resolve a plurality of hands of blackjack played by a player 20 that have resulted in a push. In this case, a single random outcome may determine if the player 20 has won all of the hands that resulted in a push, or a separate random outcome may determine if the player 20 has won each of those hands of blackjack. Note that the plurality of hands may have been played at the same time or over a period of time. For example, all of a player's wager amounts associated with pushes may be accumulated during a gaming session. At the end of the session, the player 20 rolls a pair of dice to determine if he or she will win an amount based on the accumulated wager amounts.

According to another embodiment, a random outcome is used to resolve a plurality of hands of blackjack, played by a plurality of players 20 respectively, that have resulted in a push. In this case, a single random outcome may determine if all of the players 20 have won. For example, a number of players 20 at a blackjack table 100 may have achieved a push at the same time. In this case, a single random outcome (e.g., a single coin toss) may be used to resolve all of those hands. According to another embodiment, a separate random outcome may determine if each of the players 20 have won his or her hand.

According to one embodiment, a hand of blackjack is resolved without using the dealer device 12, the player device 22, or the controller 200. For example, the dealer 10 may simply view a player's cards to determine that the hand of blackjack has resulted in a push. The player 20 may then spin a wheel to generate a random outcome that will be used to determine if the player 20 has won the hand.

According to another embodiment, the game of blackjack itself is played on an electronic device (e.g., the playing cards may be represented by images on a video terminal). In this case, the electronic device may generate the random outcome used to resolve the hand of blackjack or may communicate with the controller 200 to receive the random outcome.

According to another embodiment, the player 20 plays the game of blackjack over a communication network. For example, the player 20 may use his or her PC to communicate with a remote, Web-based game server (e.g., a sever operated by an on-line casino). In this case, the player's PC and/or the game server may generate the random outcome used to resolve the hand of blackjack.

According to another embodiment, a determination if the player has won the hand of blackjack and/or a winning amount is based on a game of skill played by the player 20.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of resolving a hand of blackjack played by a player, comprising:

playing a hand in a game of blackjack, which includes dealing a first set of accumulated cards to a player, and dealing a second set of accumulated cards to a dealer, wherein the first set of accumulated cards and the second set of accumulated cards together comprise a first random outcome;

determining that the hand of blackjack has resulted in a push;

in response to said determining, generating an additional random outcome;

displaying an indication of the additional random outcome to the player;

based on said additional random outcome, determining if the player has won the hand of blackjack;

wherein said random outcome is statistically independent of said hand of blackjack played prior to said push;

determining, based on the additional random outcome, which of a plurality of possible winning amounts the player has won if the additional random outcome results in the player winning the hand of blackjack; and providing, to the player, the winning amount the player has won.

2. The method of claim 1, further comprising:

receiving from the player an indication of a wager amount associated with the hand of blackjack, said receiving being performed prior to said determining that the hand of blackjack resulted in the push; and wherein providing comprises after said determining if the player has won the hand of blackjack, arranging for the player to receive payment of one of a the plurality of winning amounts based on the wager amount.

3. The method of claim 1, further comprising:

deciding if the push will be resolved.

4. The method of claim 3, wherein said deciding comprises:

after said determining that the hand of blackjack has resulted in the push, receiving from the player an indication of whether the push will be resolved.

5. The method of claim 1, further comprising:

initiating a random outcome generator; and receiving an indication of the random outcome.

6. The method of claim 1, further comprising:

generating the random outcome.

7. The method of claim 6, wherein said generating is performed after said determining that the hand of blackjack has resulted in the push.

8. The method of claim 7, wherein said generating is performed in response to said determining that the hand of blackjack has resulted in the push.

9. The method of claim 6, wherein said generating is performed prior to said determining that the hand of blackjack has resulted in the push.

10. The method of claim 6, wherein said generating is performed using at least one die.

11. The method of claim 6, wherein said generating is performed using a coin.

12. The method of claim 6, wherein said generating is performed using a random number generator.

13. The method of claim 6, wherein said generating is performed using a rotating wheel.

14. The method of claim 6, wherein said generating is performed using a set of playing cards.

15. The method of claim 14, wherein the set of playing cards comprises a set other than a set of playing cards used in the hand of blackjack.

16. The method of claim 1, wherein the winning amount of the plurality of winning amounts is based at least in part on the additional random outcome.

17. The method of claim 16, further comprising:

displaying the one winning amount of the plurality of winning amounts to the player.

18. The method of claim 1, wherein the winning amount of the plurality of winning amounts is based at least in part on at least one of: (i) information associated with the player, and (ii) at least one card accumulated by the player or a dealer in the hand of blackjack.

19. The method of claim 1, wherein the additional random outcome has a plurality of states, at least two of the plurality of states being associated with different winning amounts.

20. A method of resolving a plurality of hands of blackjack played by a player, comprising:

determining that a first hand of card game has resulted in a first push;

determining that a second hand of the card game has resulted in a second push;

based on a random outcome, determining if the player has won the first and second hands of blackjack, wherein an indication of the random outcome is displayed to the player, and wherein the random outcome is statistically independent of the first hand and the second hand of blackjack played prior to the first push and second push;

determining, based on the random number, which of a plurality of possible winning amounts the player has won if it is determined, based on the random number, that the player has won the first and second hands of the card game; and providing, to the player, the winning amount the player has won.

21. The method of claim 20, wherein the second hand of the card game is played after said determining that the first hand of the card game has resulted in the first push.

22. A method of determining a winner in a hand of blackjack played by a player, comprising:

receiving an indication that the hand of blackjack has resulted in a push;

transmitting, via a communication network and to a processing device located at a blackjack table at which the hand of blackjack resulted in a push, a random outcome in response to said receiving, the random outcome determining if the player has won the hand of blackjack; and causing, if the player has won the hand of blackjack, a winning amount to be provided to the player.

23. The method of claim 22, wherein the processing device is a device operated by a dealer of the blackjack table.

24. The method of claim 22, wherein the processing device is a device operated by the player.

25. The method of claim 22, wherein different possible random outcomes each correspond to one of a plurality of possible winning amounts, such that the transmitted random outcome is further determinative of which one of the plurality of winning amounts the player has won as a result of the random outcome.

26. The method of claim 22, further comprising:

determining, based on the random outcome, a winning amount that the player has won.

27. The method of claim 26, further comprising:

determining an adjusted winning amount, wherein the adjusted winning amount is determined by adjusting the winning amount based on at least one of (i) a number of hands played, (ii) particular cards accumulated by at least one of the dealer and the player, and (iii) information associated with the player; and authorizing the adjusted winning amount to be provided to the player.

28. A method of resolving a hand of blackjack, comprising:

receiving from a player an indication of a wager amount associated with the hand of blackjack;

determining that the hand of blackjack has resulted in a push;

in response to said determining that the hand of blackjack has resulted in the push, initiating a random outcome generator of a processing device associated with a table at which the hand of blackjack is being played;

receiving, from the processing device, an indication of a random outcome, the random outcome being statistically independent of the hand of blackjack played prior to the push;

based on the random outcome, determining if the player has won the hand of blackjack;

displaying to the player an indication of at least one of (i) the random outcome and (ii) the determination if the player has won the hand of blackjack; and arranging for the player to receive payment of a winning amount based on the wager amount.

29. The method of claim 28, wherein the processing device is a device operated by a dealer of the blackjack table.

30. The method of claim 28, wherein the processing device is a device operated by the player.

31. The method of claim 28, wherein different possible random outcomes each correspond to one of a plurality of possible winning amounts, such that the received indication of the random outcome is further determinative of which one of the plurality of winning amounts the player has won as a result of the random outcome.

32. The method of claim 28, further comprising:

determining, based on the random outcome, a winning amount that the player has won.

33. The method of claim 32, further comprising:

determining an adjusted winning amount, wherein the adjusted winning amount is determined by adjusting the winning amount based on at least one of (i) a number of hands played, (ii) particular cards accumulated by at least one of the dealer and the player, and (iii) information associated with the player; and causing the adjusted winning amount to be provided to the player.

*34. A method of resolving a hand of blackjack, comprising:*

*determining that the hand of blackjack has resulted in a push;*

*in response to said determining that the hand of blackjack has resulted in the push, initiating a random outcome generator of a processing device associated with a table at which the hand of blackjack is being played;*

*receiving, from the processing device, an indication of a random outcome, the random outcome being statistically independent of the hand of blackjack played prior to the push;*

*based on the random outcome, determining if a player has won the hand of blackjack;*

*displaying to the player an indication of at least one of (i) the random outcome and (ii) the determination if the player has won the hand of blackjack; and*

*arranging for the player to receive payment of a winning amount.*

*35. The method of claim 34, wherein the processing device is a device operated by a dealer of the blackjack table.*

*36. The method of claim 34, wherein the processing device is a device operated by the player.*

*37. The method of claim 34, wherein different possible random outcomes each correspond to one of a plurality of possible winning amounts, such that the received indication of the random outcome is further determinative of which one of the plurality of winning amounts the player has won as a result of the random outcome.*

*38. The method of claim 34, further comprising: determining, based on the random outcome, a winning amount that the player has won.*

*39. The method of claim 38, further comprising: determining an adjusted winning amount, wherein the adjusted winning amount is determined by adjusting the winning amount based on at least one of (i) a number of hands played, (ii) particular cards accumulated by at least one of the dealer and the player, and (iii) information associated with the player; and causing the adjusted winning amount to be provided to the player.*

*40. The method of claim 38, further comprising: determining an adjusted winning amount, wherein the adjusted winning amount is determined by adjusting the winning amount based on at least one of (i) a number of hands played, (ii) particular cards accumulated by at least one of the dealer and the player, or (iii) information associated with the player; and causing the adjusted winning amount to be provided to the player.*

* * * * *